United States Patent [19]

Yokoyama et al.

[11] Patent Number: 4,955,236

[45] Date of Patent: Sep. 11, 1990

[54] METHOD FOR OBSERVATION OF VIBRATION MODE

[75] Inventors: Kenji Yokoyama; Hidehiko Saizyo, both of Tokyo, Japan

[73] Assignee: NEC Environment Engineering Ltd., Tokyo, Japan

[21] Appl. No.: 439,292

[22] Filed: Nov. 20, 1989

[30] Foreign Application Priority Data

Nov. 22, 1988 [JP] Japan .................................. 63-295389
Jul. 31, 1989 [JP] Japan .................................... 1-198870

[51] Int. Cl.$^5$ ...................... G01D 05/28; G01H 13/00
[52] U.S. Cl. ........................................ 73/655; 250/342; 374/46; 374/124; 73/658
[58] Field of Search ............... 374/124, 45, 46, 47, 374/117; 73/655, 658; 358/113

[56] References Cited

U.S. PATENT DOCUMENTS

| 4,218,614 | 8/1980 | Miller | 73/655 X |
| 4,733,079 | 3/1988 | Adams et al. | 374/124 X |
| 4,875,373 | 10/1989 | Twerdochlib | 73/655 |
| 4,885,633 | 12/1989 | Buck | 358/113 |

FOREIGN PATENT DOCUMENTS 0224169 6/1985 Fed. Rep. of Germany ........ 73/658

Primary Examiner—Daniel M. Yasich
Attorney, Agent, or Firm—Kanesaka and Takeuchi

[57] ABSTRACT

Method for observation of vibration mode in which a substance inclusive of structures and materials to be observed in vibration mode is vibrated, heat generated by giving vibration is held at the vibrating parts, infrared emission energy emitted from the substance is optically detected to visually display the distribution of temperature change at each vibrating part as thermal imagery.

7 Claims, 5 Drawing Sheets

F I G. 3A
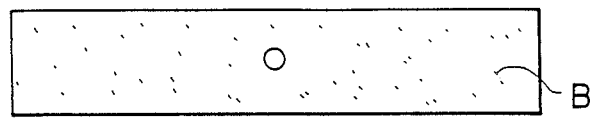
F I G. 3B
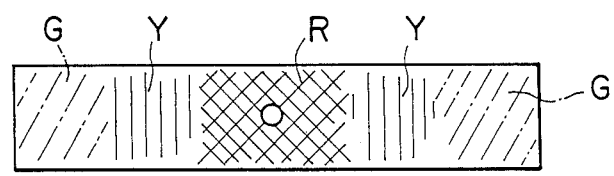
F I G. 3C
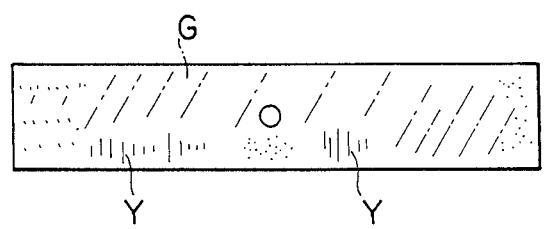
F I G. 3D
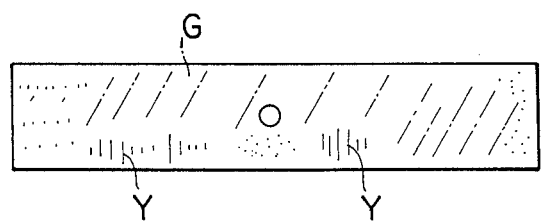

METHOD FOR OBSERVATION OF VIBRATION MODE

BACKGROUND OF THE INVENTION

1. Field of the Invention

The present invention relates to a method for visually observing vibration mode due to vibration occured at structures or materials.

2. Description of the Prior Art

It is very important to know vibration mode when structures or materials are vibrated in designing machines, structures, and etc.

Conventionally, there has been no method for directly detecting vibration mode. For observation of vibration mode generated in a structure, in a conventional method, so-called multi-point observation method has been used, wherein acceleration sensors are provided on several points of the surface of the structure to be measured. In this conventional method, measured values obtained from each measuring point have collected as data. The data have been analysed to know vibration mode on the vibrating faces by using mode analysis.

In the above-mentioned conventional method, there have been troublesome defects in observing operation such that many acceleration sensors have been required; a large numeral values has been required due to repeated measurement at the respective points; provision of sensors and cable wiring have been required to obtain data.

On the other hand, there has been known FEM (Finite Element Method) as a method in which vibration mode has been measured by calculation. However, the FEM is mere simulation and requires calculation of large amount of numeral values. In the FEM, there have been many cases where the obtained result has not been always agreed with the actual vibration mode which occurs at the structure to be measured.

SUMMARY OF THE INVENTION

An object of the present invention is to solve the abovementioned problems of the conventional methods and to provide a method for visual observaton of two-dimensional vibration mode generated on a vibrating face.

Another object of the present invention is to provide a method for optically detecting heat caused by vibration of a substance with a temperature detecting device and displaying it as thermal imagery.

Still another object of the present invention is to provide a method for carrying out observation without diffusion on the heat generated by vibration of a substance to be observed by, e.g. applying treatment on a surface of a substance to be observed so as to retain heat generated at vibration parts.

Still another object of the present invention is to provide a method for observation of vibration mode by applying heat-insulation on a surface of a substance to be observed.

Other objects of the present invention will become more apparent from the brief description and accompaning drawing.

BRIEF DESCRIPTION OF THE DRAWING

FIGS. 3A to 3D are views showing color-change of vibration mode in the present examples and comparative examples.

DETAILED DESCRIPTION OF PREFERRED EMBODIMENTS

When vibration generated on a sample, material, or substance by giving vibration to the sample is converted into heat, the magnitude of vibration can be measured as that of heat-change. The substance emits electro magnetic wave having strength corresponding to its surface temperature. In accordance with increase of temperature of the substance, radiant energy increases and radiant energy having short wave length relatively increases. Usually, the wave length of radiant energy at $-40$ to $1,600°$ C. which is considered as a subject of temperature measurement is infrared radiation of 2 to 13 $\mu$m. For this reason, when an amount of infrared emission is measured, the temperature of the substance can be known without contacting the substance. By utilizing the principle, actual reduction to practice has been done as an infrared emission thermometer which displays the temperature of a substance to be measured by detecting infrared radiation and converting it to electric signals and a temperature detecting device is provided with a camera device including optical systems which displays temperature distribution of respective parts of the surface of the substance to be observed in a screen as thermal imagery.

Figure 1:
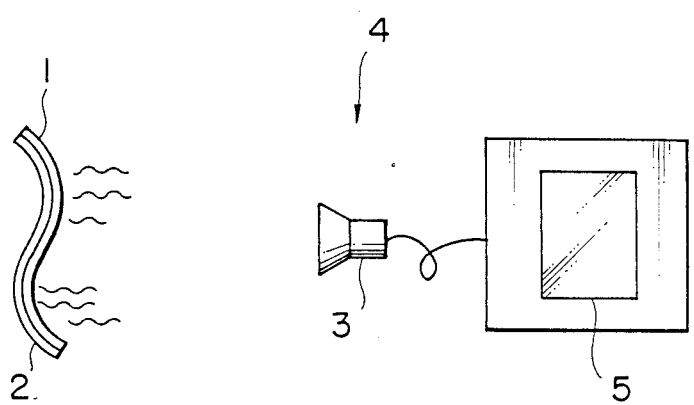
FIG. 1 is a view showing principle of the method according to the present invention.

When the substance to be measured is pictured by using the temperature detecting device, a thermal imagery showing the temperature distribution of respective parts of the surface of the substance can be obtained. However, even if the substance vibrates, usually the thermal imagery does not change in accordance with the vibration mode on a vibrating face. In this connection, when heat generated on the surface of the substance by the vibration is held at the vibrating parts as it is, the temperature distribution according to the vibration mode can be obtained as thermal imagery. Accordingly, it is necessary to conduct such treatment that the heat generated on the surface of the substance is kept at the parts where heat is generated. As suitable materials for the "heat-holding" treatment, damping materials and heat insulating materials are considered. The damping material is a material for suppressing vibration on the surface of a substance. When the vibration is suppressed, vibration energy is converted into thermal energy. Although the thermal energy is to be held at the parts where heat is generated, damping materials generally have the property to hold energy. The thermal insulating material has small thermal transmitting property and has been generally used for the purpose of keeping warm or keeping cool. That is, it is a material to hold heat generated by vibration at the parts where heat is generated. For example, when a substance with a damping material thereon such as a paste-like damping material (damping material DP020 manufactured by NEC Environment Engineering Ltd) which comprises epoxy resin as a main constituent and is added with fillers vibrates, the substance is subjected to damping action and thus, vibration energy is converted into thermal energy to raise the temperature of the substance. As the damping energy is large at the widest parts of vibration mode and is small at points, the temperature distribution is produced according to the vibration mode. Therefore, when the substance 2 having a damping material 1 is observed by a temperature detecting device 4 having a detector 3 of infrared radiation therein as shown in FIG. 1, thermal imagery which has temperature distribution exactly corresponding to the vibration mode of the substance is displayed on a display of a temperature detecting device 4. In the present invention, the damping material need not always piled up at a side where the substance 2 is taken a picture. Even when the damping material 1 is piled up on the opposite-side face of a picture, the same result can be obtained if vibration energy caused by vibration can be converted into heat and the temperature of the substance can be raised by said heat. The damping material need not always be piled up. The damping material may be applied by means of starching, sticking or integral molding. The more the damping property of the damping material is great, the more the temperature raise of the substance due to damping becomes high. Therefore, stripe pattern of temperature distribution corresponding the vibration mode appears clearly. By giving damping property, there is an advantage such that the more the amplitude is great, the more the generation of heat becomes great. Therefore, formation of stripe-pattern of temperature distribution can be emphasized according to the magnitude of vibration amplitude due to the fact that as greater the amplitude is, greater the generation of heat is. In this case, if the substance to be observed per se is made of materials having great damping property, it is of course meaningless to additionally give damping property to the substance. Similarly, when a heat-insulating material is applied to a surface of a substance to be measured, generation of heat in greater amount or small amount is held as it is. When said state is taken by the temperature detecting device, the stripe pattern of temperature distribution on the surface of the substance is displayed on the screen of the temperature detecting device as thermal imagery.

The examples of the present invention are shown below.

EXAMPLE 1

Figure 2:
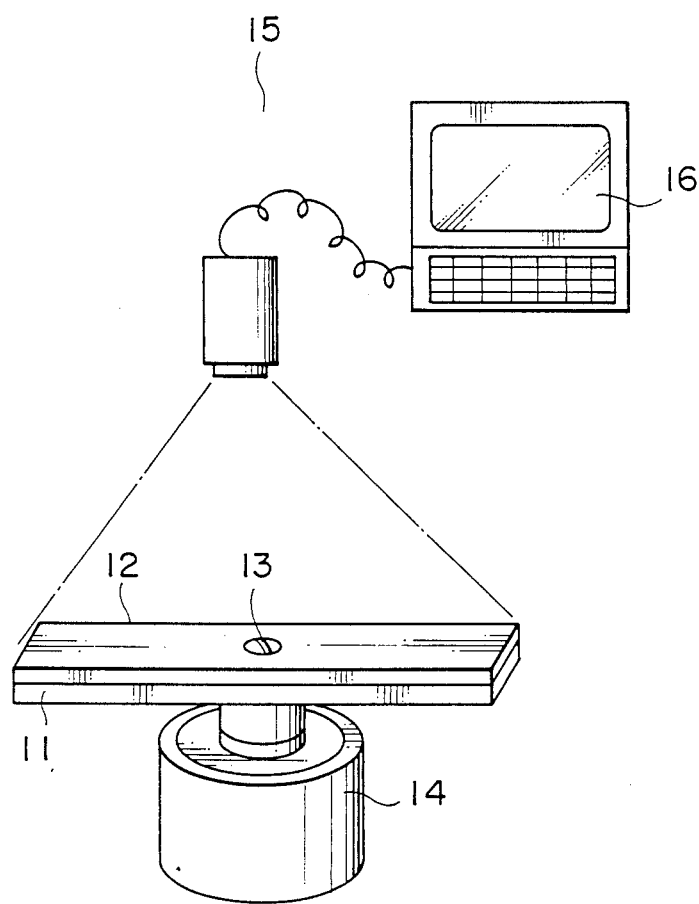
FIG. 2 is a view showing a device used in one example.

In FIG. 2, a damping material 12 (damping material DP020 manufactured by NEC Environmental Engineering Ltd.) was piled up on one face of an iron plate 11 of 300 mm × 32 mm × 5 mm in the uniform thickness of 5 mm (hereinafter referred to as sample plate). The sample plate was horizontally installed to a vibrator 14 by a screw 13 at the center of the sample plate. A Thermotracer® 15 (thermotracer 6T61 manufactured by NEC Sanei Instrument Ltd.) was provided right above the sample plate. The sample plate was given vibration by the vibrator 14 in resonance frequency of bending moment of the sample plate, so that thermal imagery of the sample plate could be observed on the screen 16 of the thermotracer 15. In this case, room temperature was 24° C. The thermotracer used in this Example is a type that the temperature of an object to be pictured was displaced by color-change, and according to the raise of the temperature, the change of the temperature was shown in order of blue color B, green color G, yellow color Y and red color R.

In a state of no vibration, the whole surface of the sample plate showed blue color B which indicates the temperature range of 23.1° to 23.4° C. as shown in FIG. 3A. When 223 Hz corresponding to the resonant frequency of the primary bending moment of the sample plate was applied to the sample plate at 150 (G) for ten minutes, the central region of the sample plate was shown by red color R which shows the temperature range of 29° to 31° C. as shown in FIG. 3B. The region on the both sides was shown by yellow color Y which shows the temperature range of 25° to 27° C. and both ends of the sample plate were shown by green color G which indicates the temperature range of 22° to 23° C. As mentioned above, the primary mode wave form of the vibration was clearly exhibited by the change of color over the length of the sample plate.

Next, 1218 Hz corresponding to the secondary bending mode was applied to the sample plate at 150 (G) for 10 minutes. As shown in FIG. 3C, the red color R appeared at the centeral region and the region of the both sides. The portion between each red color region was shown by yellow Y and the both ends were shown by green color G. This means that the typical wave form of vibration secondary mode in which the widest portion of vibration wave form having great displacement is shown at two positions was clearly displayed on the screen by the color change.

COMPARATIVE EXAMPLE 1

An iron plate having the same size of the iron plate used in Example 1 was installed on a vibrator in the same manner as in Example 1. 201 Hz corresponding to resonant frequency of the primary bending mode was applied to the iron plate at 200 (G) for twenty minutes. As shown in FIG. 3D, green G appears over the length of the iron plate yellow color Y merely appeared partly and irregurarly. Thus, clear color change corresponding to vibration mode was not shown.

EXAMPLE 2

Figure 4:
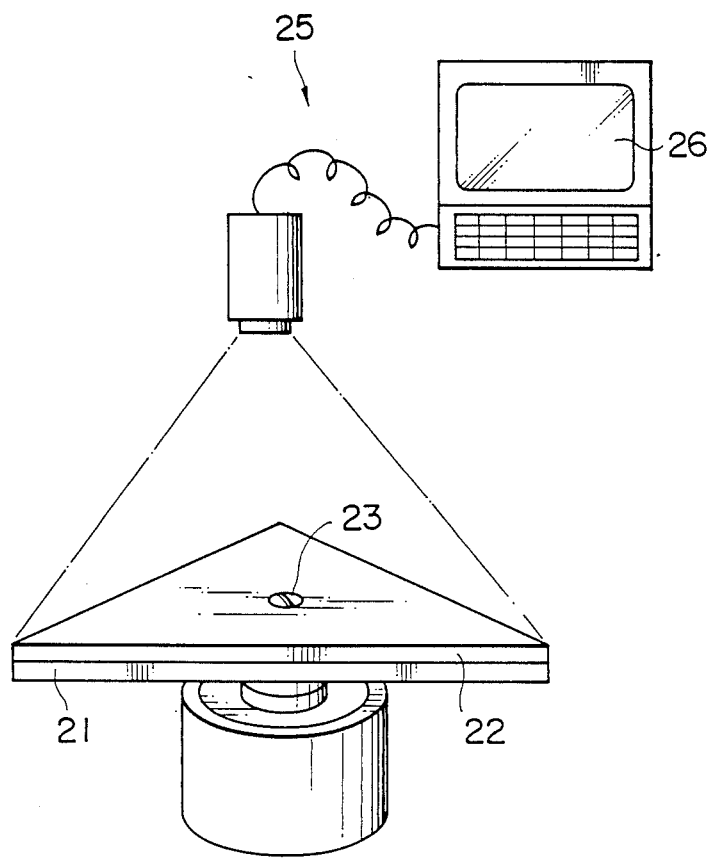
FIG. 4 is a view of a device using other examples.

In FIG. 4, heat-insulating material 22 was piled up on one face of an iron plate 21 having almost regular triangle one side of which is 300 mm with uniform thickness of 3 mm of the heat-insulating material 22. Thus piled-up plate is hereinafter referred to as a sample plate.

In this Example, two types of sample plates were prepared. One sample plate ① was prepared by using thermoplastic material (thermoplastic material A-57 manufactured by NEC Environment Engineering Ltd.) which had c/Cc 3 to 4% of damping and 0.4 w/m·k of heat conductivity on a heat-insulating material 22. The other sample plate ② was prepared by using themosetting material (thermosetting material DP-020 manufactured by NEC Environmental Engineering Ltd.) which had c/Cc 3 to 4% of damping and 1.4 w/m·k of heat conductivity. The both samples plates ① and ② were horizontally installed on a vibrator 24 with screw 23 at their center, respectively. On the other hand, the sample plate was vibrated at resonant frequency of its bending moment. A thermotracer ® 25 (thermotracer 6T61 manufactured by NEC Sanei Instrument Ltd.) was provided right above the respective sample plates. Thermal imagery of the sample plates could be observed on the screen 26 of the thermotracer 25. In this case, room temperature was 24° C. The thermotracer used in this Example was a type of thermotracer in which the temperature of an object to be pictured was displayed by change of color; the change of temperature being in order shown by blue color B, green color G, yellow color Y and red color R in accordance with the raise of temperature.

Figure 5A:
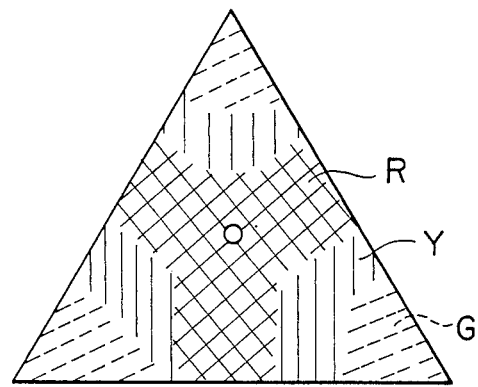
FIGS. 5A and 5B are views showing color-change of vibration mode in the other examples.

In a state of no vibration, the both sample plates ①  and ② showed green color G which indicates the temperature range of room temperature. When about 250 Hz corresponding to resonant frequency of the primary bending mode of the sample plates was applied to the sample plates at about 30 (G) for 0.5 minute, the sample plate ① indicated, as shown in FIG. 5A that red color R in thick band form which shows the temperature range higher than room temperature by +1.0° to +1.5° C., at the central region of the sample plate ① and at wide range from the central region to each wide. A certain region of outer side of the sample plate ① showed yellow color Y which indicates temperature higher than room temperature by 0.5° C.

Figure 5B:
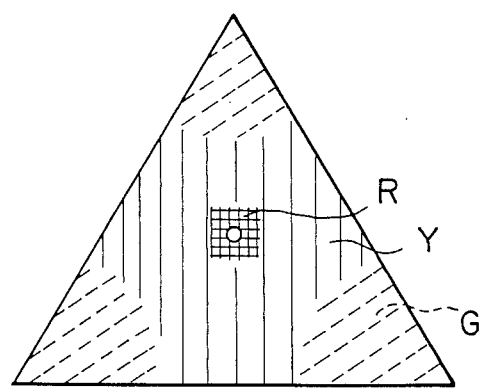

On the other hand, the sample plate ② indicated, as shown in FIG. 5B, red color R only in slight region at the center of the sample plate ② and indicates yellow color Y in thick band form from the periphery of the red color R to the centers of each side. This color pattern indicated the shape of the inherent primary mode in the form of the sample plate. As apparent from comparison of FIG. 5A and FIG. 5B, the sample plate using less heat-conductivity could more clearly showed the shape of vibration mode. The fact that heat-conductivity is small means that heat generated at the vibrating part is held at the part where heat is generated without being diffused. Accordingly, there is produced clear difference of temperatures between the vibrating part and non-vibrating part.

As described above, according to the present invention, the vibration mode of a substance can be shown by the change of color and therefore, secondary image of vibrating mode can be directly and visually observed at real time and by sensing away from a substance which is vibrated.

Accordingly, the present invention has such effects that the present invention can be utilized in various fields of civil engineering and construction, machines and devices, etc. and that easy evaluation of various data can be conducted by obtaining data of vibration mode of running automobiles and ships, data of vibration mode of flying substances in the universe and flight field, and data of vibration mode of a small surface of, e.g., IC where installation of accerelation sensor is impossible, due to no contact measurement.

What is claimed is:

1. A method for observation of vibration mode comprising the steps of:
    applying treatment for preventing diffusion of heat generated on at least one face of a substance to be observed,
    vibrating the substance to convert from vibrating energy to thermal energy,
    detecting distribution of temperature on the surface of the substance from the thermal radiant energy emitted on each part of said substance, and
    displaying change of temperature distribution on each part of the substance corresponding to shape of the vibration mode as thermal imagery.

2. A method for observation of vibration mode as claimed in claim 1, wherein the surface of the substance vibrated is taken a picture by using a temperature detecting device including an optical system therein to obtain data of vibration mode of the substance without contact.

3. A method for observation of vibration mode as claimed in claim 1, wherein damping material is applied to the surface of the substance as a treatment to prevent the diffusion of heat generated at each part of the substance.

4. A method for observation of vibration mode as claimed in claim 1, wherein heat-insulation is applied to the surface of the substance as a treatment to prevent the diffusion of heat generated at each part of the substance.

5. A method for observation of vibration mode as claimed in claim 1, wherein the surface of the substance is provided with one of damping and heat insulating materials by one of piling-up, pasting, sticking and integral formation as a treatment to prevent diffusion of heat generated at the substance.

6. A method for observation of vibration mode as claimed in claim 5, wherein the treatment to prevent the diffusion of heat generated at the substance is made on a face of the substance to which a picture is taken.

7. A method for observation of vibration mode as claimed in claim 5, wherein the treatment to prevent the diffusion of heat generated at the substance is made on an opposite face with respect to the face of the substance to which a picture is taken.

* * * * *